2 Sheets—Sheet 1

W. WALLACE.

CARPETS.

No. 7,112.

Reissued May 16, 1876.

Witnesses
Harry Housman Jr
Harry Smith

William Wallace
by his Attorneys
Howson and Sons

N. PETERS, PHOTO-LITHOGRAPHER, WASHINGTON, D. C.

2 Sheets—Sheet 2.

W. WALLACE.

CARPETS.

No. 7,112. Reissued May 16, 1876.

Witnesses.
R. E. Grant
W. T. Hutchinson

Inventor.
William Wallace
by his attorneys
Howson and Sons

N. PETERS, PHOTO-LITHOGRAPHER, WASHINGTON, D. C.

UNITED STATES PATENT OFFICE.

WILLIAM WALLACE, OF PHILADELPHIA, PENNSYLVANIA, ASSIGNOR TO HIMSELF AND CHARLES McALLISTER, OF SAME PLACE.

IMPROVEMENT IN CARPETS.

Specification forming part of Letters Patent No. 104,232, dated June 14, 1870; reissue No. 4,904, dated May 14, 1872; reissue No. 7,112, dated May 16, 1876; application filed April 3, 1876.

*To all whom it may concern:*

Be it known that I, WILLIAM WALLACE, of Philadelphia, Pennsylvania, have invented certain Improvements in Carpet Fabrics, of which the following is a specification:

My invention relates to an improvement in the carpet fabrics known as "damask," which are composed of warp-threads and alternate thick and thin filling or weft-threads, the warp consisting of a series of woolen threads arranged in sets, four threads to a set, and these four threads passing through one space of the reed in weaving. Fabrics of this class present two wearing-surfaces, produced by so dividing the warp-threads for the reception of the thick filling that one portion of said warp-threads forms one surface, and the other portion the opposite surface of the fabric.

In my improvement the relative arrangement of warp-threads and thick filling remains as usual, my improved carpet fabric being produced by dividing the warp-threads, for the reception of the thin filling or binding threads, in the manner fully explained hereafter, so that the said fabric shall be more compact in texture, and have a finer surface than ordinary fabrics of this class, without the consumption of more material than the latter require.

Figure 1:
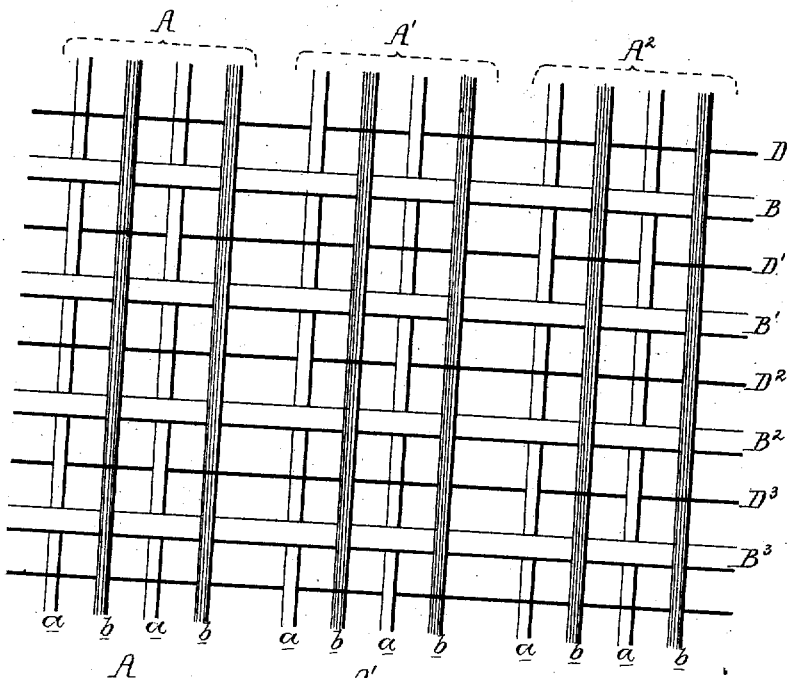
Figure 2:
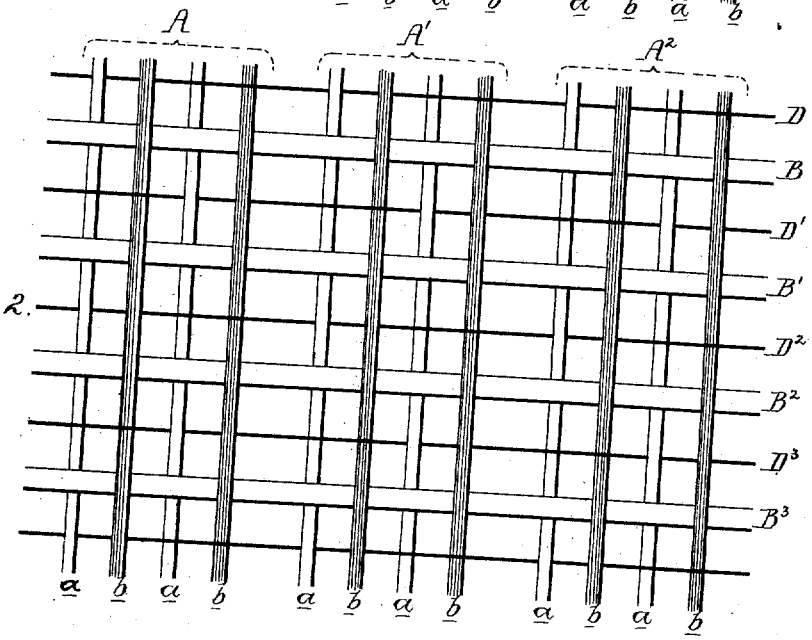

In the accompanying drawing, Figure 1, Drawing No. 1, is a diagram representing the disposal of the threads of an ordinary damask carpet; Fig. 2, a diagram illustrating the arrangement of the threads in my improved fabric, and Figs. 3 and 4, Drawing No. 2, are views representing harness employed in carrying out my invention.

In order that my invention may be more readily understood, I will first proceed to describe the mode of disposing of the weft and warp threads in ordinary damask carpets, reference being had to Fig. 1, Drawing No. 1, which represents a portion of such a carpet with the threads separated or not beaten up. Thus, in Fig. 1, A represents one set of four warp-threads, $A^1$ an adjoining set, and $A^2$ a third set. It should be understood, however, that although the term "warp-thread" is used, each of the threads *a a* and *b b* of each set may consist of more than one strand, according to the quality of the carpet to be produced. These warp-threads are controlled by the usual jacquard apparatus, which is too well known to need description here.

The weft-threads consist of a series of thick filling-threads, B, $B^1$, $B^2$, and $B^3$, and thin filling-threads D, $D^1$, $D^2$, and $D^3$, arranged alternately, as shown in Fig. 1, the thick filling-threads serving to impart substance to the carpet, and the thin threads serving to impart strength as binding-threads.

It will be observed, on referring to the illustration, Fig. 1, of a common damask carpet, that the thick filling-threads B $B^1$ $B^2$ $B^3$ pass over the threads *a* and under the threads *b* of the warp of each set. The thin filling-threads also pass over two and under two threads of each set; but while the threads D and $D^2$ pass over the threads *a* and under the threads *b* of the sets A $A^2$, and under the threads *a* and over the threads *b* of the set $A^1$, in the case of threads $D^1$ and $D^3$ this order is reversed. This disposal of the thin filling-threads D $D^1$ $D^2$ $D^3$ serves to bind the fabric, but at the same time renders the carpet of so open a texture that lodgments for dust and dirt are afforded, while the threads of one color beneath can be distinguished from above through the interstices between threads of another color; consequently the pattern of the carpet is rendered more or less spotted and unsightly. The aim of my invention, which I will now proceed to describe, has been to overcome this defect of ordinary damask carpets.

On reference to Fig. 2, which illustrates my improved carpet with the threads separated, it will be observed that the warp consists of a series of sets of threads, four threads in each set, in the present instance each thread being being composed of one or more strands, as circumstances may require, the weft consisting of alternate thick and thin filling-threads; in fact, precisely the same threads may be employed as in making the common damask carpet described above.

For the passage of the thick filling-threads the warp-threads are divided as in the ordinary carpet; but for the passage of the thin filling the said warp-threads are differently divided, so that instead of passing over two warp-threads of one face, and under two threads of the opposite face in each set, it passes alternately over and under two threads, of which one is a thread of one face and the other a thread of the other face of the fabric. This plan of operating the warp-threads involves the necessity of employing mechanism for the purpose, for while the ordinary jacquard apparatus will serve to raise the threads for the thick filling, other appliances are necessary for operating the threads for the thin filling.

Figure 3:
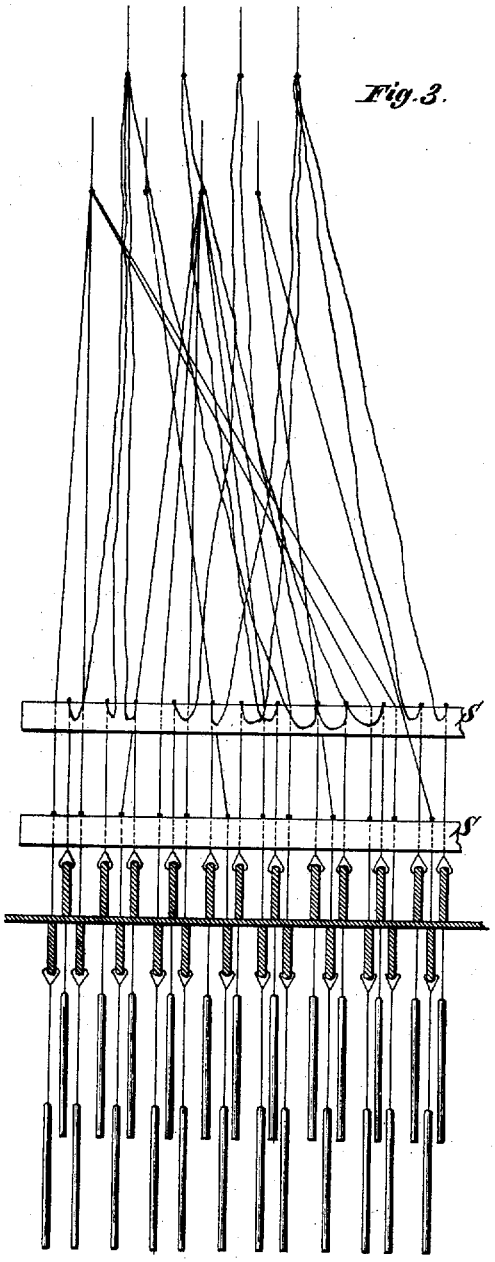
Figure 4:
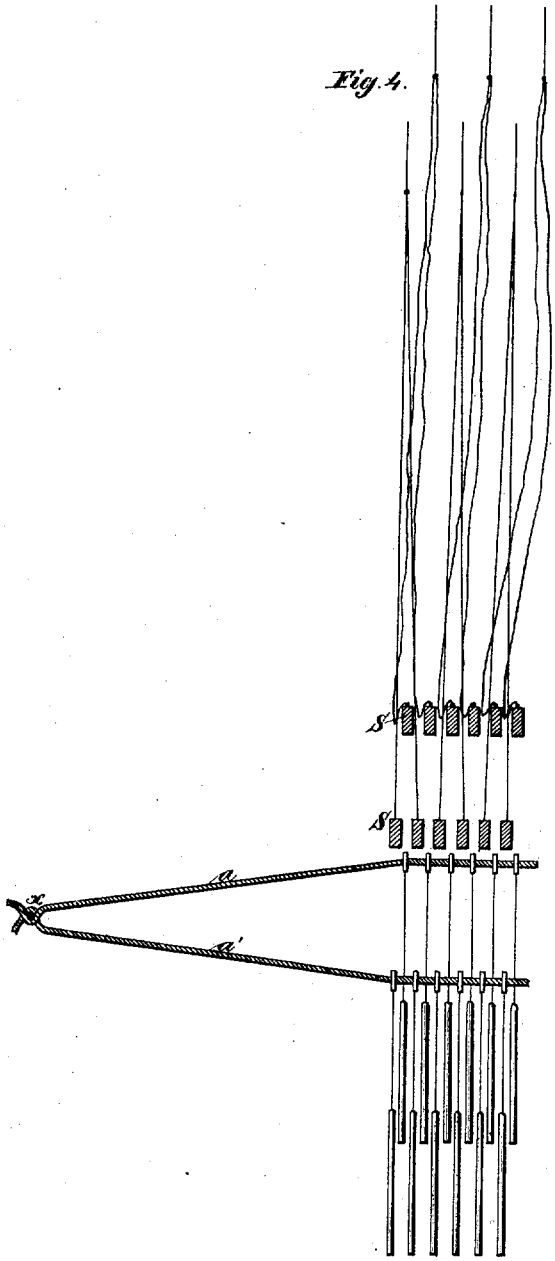

I will briefly describe the mechanism which I have employed for carrying my invention into effect, reference being had to Drawing No. 2, in which Figs. 3 and 4 show the harness, the lines *a* and *a'* representing the separated warp-threads, and *x* being the point where the weft is beaten up. I dispense with the usual "comber-board" of the jacquard apparatus, and in place of the same use the shafts S S, all of which are connected to the warp-thread by the harness in the usual manner, and these shafts are controlled by mechanism operated from any working part of the loom, independently of the usual jacquard mechanism, the duty of which is to control the warp-threads for the thick filling, while the threads to be separated for the thin filling are controlled by the shafts S, and the independent mechanism which operates the same.

The harness of the ordinary jacquard apparatus passes the shaft S freely, but has knots with which the shafts come in contact when elevated.

Different mechanical devices may be employed for carrying my invention into effect, but the above, being simple and effective in practice, has been selected to enable those familiar with the art of weaving to understand how my improved carpet can be manufactured. It is this peculiar disposal of the warp-threads, in respect to the thin filling-threads, which renders my improved carpet more compact in texture, and finer as regards its surface, than ordinary damask carpet.

I claim as my invention and as a new manufacture—

A damask-carpet fabric, in which the warp-threads of a set, on either side of the thin filling, consist one portion of the threads of one face, and the other portion of the threads of the opposite face, of the fabric, as set forth.

In testimony whereof, I have signed my name to this specification in the presence of two subscribing witnesses.

WILLIAM WALLACE.

Witnesses:
HARRY HOWSON, Jr.,
HARRY SMITH.